United States Patent [19]

Van Peteghem

[11] 4,026,773

[45] May 31, 1977

[54] EXTRACTING METAL VALUES FROM MANGANIFEROUS OCEAN NODULES

[75] Inventor: Antoine L. Van Peteghem, Olen, Belgium

[73] Assignee: Metallurgie Hoboken Overpelt, Hoboken, Belgium

[22] Filed: Jan. 14, 1976

[21] Appl. No.: 648,927

[30] Foreign Application Priority Data

Jan. 17, 1975 Luxembourg .......................... 71669
July 11, 1975 Luxembourg .......................... 72958

[52] U.S. Cl. ................................. 204/108; 423/37; 423/38; 423/46; 423/50; 423/54; 423/63; 423/68; 423/100; 423/109; 423/127; 423/132; 423/139; 423/140; 423/150; 423/633; 423/636

[51] Int. Cl.² ................. C01G 51/00; C01G 53/00; C01G 45/02; C25C 1/12

[58] Field of Search .................. 423/37, 38, 49, 50, 423/53, 54, 63, 68, 100, 109, 127, 132, 139, 140, 150, 488, 633, 605, 166; 204/108

[56] References Cited

UNITED STATES PATENTS

| 3,441,372 | 4/1969 | Pegler et al. .......................... 423/100 |
| 3,770,868 | 11/1973 | Swinkels et al. ....................... 423/50 |
| 3,824,161 | 7/1974 | Aue et al. ............................ 423/139 |
| 3,880,651 | 4/1975 | Queneau et al. ...................... 423/150 |
| 3,903,236 | 9/1975 | McCutcheon et al. ................ 423/38 |
| 3,950,486 | 4/1976 | Cardwell et al. ...................... 423/38 |

*Primary Examiner*—Earl C. Thomas
*Assistant Examiner*—Brian E. Hearn
*Attorney, Agent, or Firm*—Pennie & Edmonds

[57] ABSTRACT

Metal values are extracted from manganiferous ocean floor nodule ore by treating the ore with hydrochloric acid, thereby producing chlorine and a starting pulp containing a solution of the metal chlorides and a solid residue. The starting pulp is subjected to at least two subsequent acidifications with HCl, each acidification being followed by addition of fresh ore, thereby producing chlorine and a final pulp containing a concentrated solution of metal chlorides and a solid residue. The solid residue is separated from the concentrated solution and substantially all the metal values, except manganese and alkali and alkaline earth metals, are separated from the solution. The manganese is separated from the solution by treatment with chlorine, at least the major portion of which was produced in the preceding leaching steps, while maintaining the solution at a pH of between about 3 and 7 by addition of a neutralizing agent such as MgO or $Mg(OH)_2$ whereby the manganese is precipitated in the form of $MnO_{(1+x)}$ in which $x$ is between 0.5 and 0.7. The manganiferous precipitate is separated from the resulting solution of magnesium chloride and the latter is pyrohydrolysed in the atomized state to regenerate the neutralizing agent and HCl, which can be recycled.

19 Claims, 1 Drawing Figure

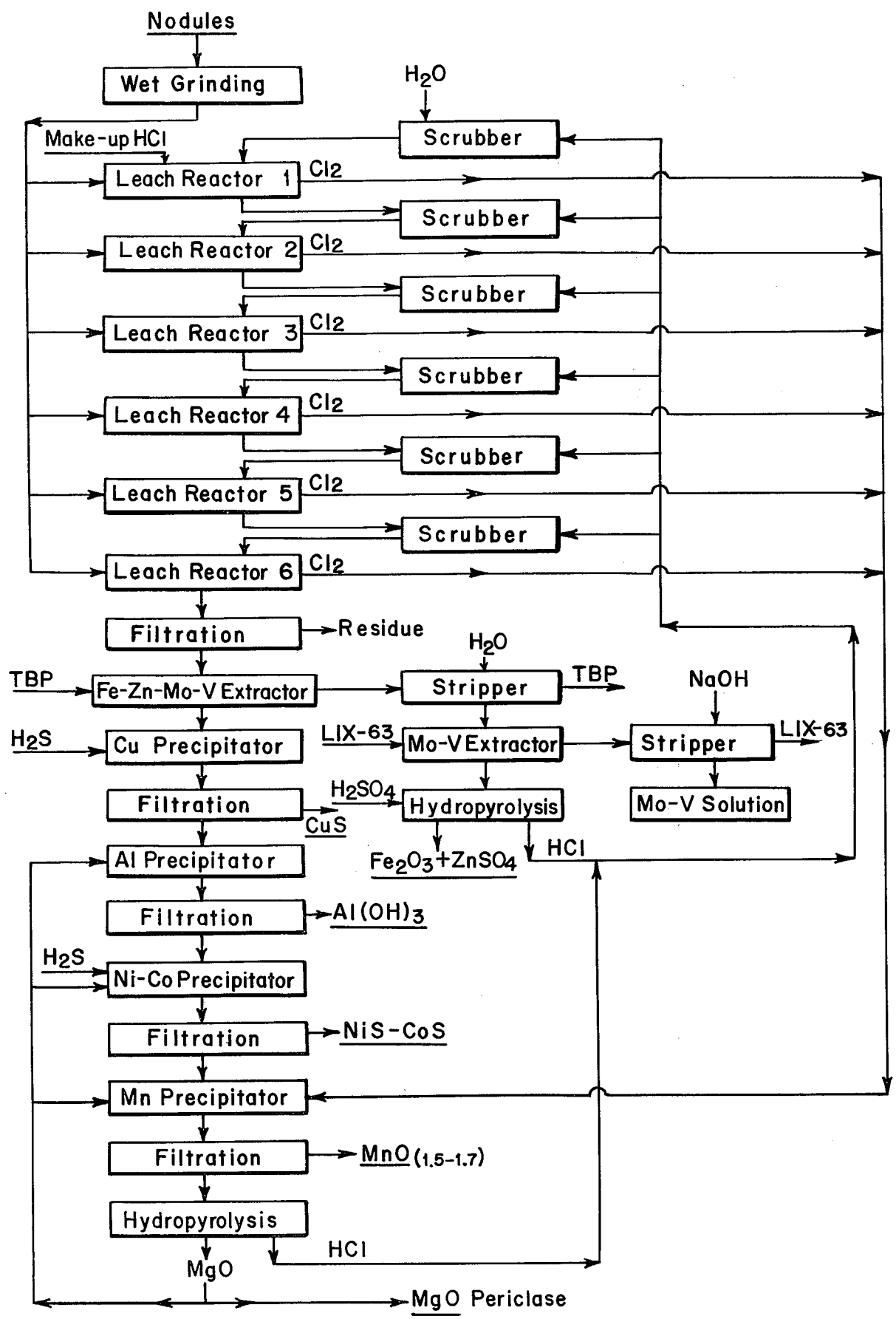

EXTRACTING METAL VALUES FROM MANGANIFEROUS OCEAN NODULES

BACKGROUND OF THE INVENTION

The present invention relates to a process for extracting metal values from manganiferous ocean floor nodule ore by means of hydrochloric acid.

Manganiferous ocean floor nodule ore comprises primarily oxides of tetravalent manganese and trivalent iron and secondarily other metal compounds, generally oxides, including those of copper, nickel and cobalt and, often, other elements such as magnesium, aluminum, zinc, vanadium and molybdenum.

According to known processes, crushed ocean floor nodule ore is contacted countercurrently in a five-stage reactor with an aqueous HCl solution having an initial concentration of 11 N. The chlorine resulting from the $MnO_2$-HCl reaction is vented from each stage. Additional HCl gas may be added to one or more stages. From the aqueous leach solution leaving the final stage, Fe, Cu, Ni and Co are selectively extracted. The remaining manganiferous solution is then electrolyzed or treated for obtaining anhydrous manganese chloride, which is transformed into manganese metal in an aluminum reduction cell. The extracted $FeCl_3$ can be used to prechlorinate the ore or is reacted with water vapor to form iron oxide and HCl which is recycled to the five-stage reactor. By-product aluminum chloride from the reduction cell is also reacted with water vapor to form aluminum oxide and HCl which is recycled to the reactor.

These prior art processes present several drawbacks. They require a complicated leaching apparatus and a highly concentrated leaching reagent, which is always expensive, even if produced from recycled HCl. If recycled HCl, which is normally diluted with combustion gases, is directly added to the leaching reactor, the chlorine vented from the reactor will be diluted with the same gases. No clear-cut separation is provided between manganese on the one hand and the alkaline and alkaline-earth metals on the other, so that considerable amounts of manganese and chloride ions are lost either in rejected mother liquors or in drainings. No regeneration is provided for the neutralizing agent which is used in some of the selective extraction stages. Moreover, no recycling is provided for chlorine vented from the leaching reactor.

A well-known method for demanganizing a solution, e.g., a chloride solution, consists in treating the solution with chlorine in order to oxidize Mn++ into insoluble $MnO_2$, while adding a base, e.g., MgO, to the solution in order to neutralize the generated HCl according to the equations:

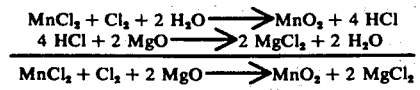

The above method has been proposed in U.S. Pat. No. 3,770,868 as part of a cyclic process for preparing synthetic manganese dioxide from high-grade terrestial manganese dioxide ore, in which chlorine generated during the hydrochloric acid leaching of the ore is used together with make-up chlorine to precipitate manganese dioxide in the purified leach solution, the pH of which is maintained above 0.5, preferably between 0.5 and 3, and in which magnesia and hydrochloric acid or magnesium hydroxide and hydrochloric acid are regenerated by spray roasting of the final magnesium chloride solution.

Applying such a cyclic process to ocean floor nodule ore treatment, the primary aim of which is to produce high-value non-ferrous metals such as copper, nickel and cobalt, would lead to the production of large quantities of manganese dioxide, for which there is only a small market; therefore, all or the major part thereof would have to be reduced directly or indirectly into manganese metal. Moreover, since up to 15% of the manganese contained in the nodule ore may be in the bivalent state and does not generate chlorine in the leaching step, excessive amounts of make-up chlorine would be required in the demanganizing step.

SUMMARY OF THE INVENTION

The present invention is primarily directed to a cyclic process, which allows producing in a simple way an almost saturated leach solution by using mainly cheap, recycled HCl and which provides for a demanganizing step by chlorine, which needs little or no make-up chlorine and relatively small amounts of neutralizing agent, thereby precipitating a manganese oxide which can be more economically reduced to manganese metal than $MnO_2$.

The present invention is also directed to a novel process for recovering copper, nickel, cobalt and other metals from the leach solution before the latter is demanganized.

In accordance with the present invention a process is provided for extracting metal values from manganiferous ocean floor nodule ore, which comprises the following steps:

a. an amount of nodule ore is treated with hydrochloric acid containing at least 150 g HCl/liter, the amount of HCl used corresponding to between about 0.95 and 1.3 times the stoichiometric amount of HCl needed to transform into chlorides the metal values contained in the ore, thus producing chlorine and a starting pulp containing a solution of the metal chlorides and a solid residue;

b. the starting pulp is subjected to at least two subsequent acidifications with HCl, each acidification being carried out by adding HCl to the pulp in an amount needed to obtain an initial HCl content in the pulp of at least 150 g/l an HCl content of at least 150 g/l and followed by addition of fresh nodule ore in amounts such as to obtain the HCl:nodule ratio defined in step (a), thus producing chlorine and a final pulp containing a concentrated solution of metal chlorides and a solid residue;

c. the solid residue is separated from said concentrated solution;

d. substantially all metal values except manganese and the alkali and alkaline earth metals, are separated from the concentrated solution;

e. manganese is separated from the solution resulting from step (d) by treating the solution with chlorine, at least the major part of which has been produced in steps (a) and (b), while maintaining the pH of the solution between 3 and 7 by addition of a neutralizing agent chosen from the group consisting of MgO and $Mg(OH)_2$, at least the major part of the manganese being precipitated as $MnO_{(1+x)}$ according to the equations:

$$MnCl_2 + (1+x)MgO + x\,Cl_2 \rightarrow MnO_{(1+x)}\downarrow + (1+x)MgCl_2$$

or $$MnCl_2 + (1+x)Mg(OH)_2 + x\,Cl_2 \rightarrow MnO_{(1+x)}\downarrow + (1+x)MgCl_2 + (1+x)H_2O$$

wherein x is comprised between 0.5 and 0.7;

f. the manganiferous precipitate is separated from the resulting magnesium chloride solution;

g. the magnesium chloride solution is pyrohydrolyzed in the atomized state thus regenerating the neutralizing agent and HCl; and h. regenerated neutralizing agent is recycled towards step (e) and regenerated HCl is recycled towards step (b).

Preferably, the starting pulp is subjected to 4 or 5 acidifications. In doing so, it is possible to obtain an almost saturated chloride solution, containing from 110 to 135 g Mn/l, starting from wet ground nodule ore slurry, all or the major part of said acidifications being carried out up to an acid content of between 150 and 250 g HCl/l just by scrubbing with the pulp the exit gases from the pyrohydrolyzing step (g) and, possibly, from the pyrohydrolyzing of the metal chlorides separated in step (d).

Normally, all manganese will be precipitated as $MnO_{(1+x)}$. However, if desired, a minor part of the manganese can be precipitated as $MnO_2$ according to prior art methods.

In order to precipitate $MnO_{(1+x)}$, it has been discovered to be critical to maintain the pH of the solution in step (e) between 3 and 7 and to avoid using chlorine in excess. Excess chlorine would transform $MnO_{(1+x)}$ into $MnO_2$; operating below pH 3 would also lead to $MnO_2$, whereas above pH 7 it would be necessary to dilute tremendously the solution to be demanganized thereby rendering step (g) highly uneconomical. Between pH 3 and 7, $MnO_{(1+x)}$ can be precipitated rapidly, a typical demanganizing run taking, e.g., one hour, and with little or no dilution so that demanganized solutions may be produced, which contain between 250 and 450 g/l $MgCl_2$, while avoiding the production of too-concentrated solutions of e.g., 500 g/l $MgCl_2$, which could not be treated without dilution in conventional spray-roasting equipment. However, it is preferred to carry out the $MnO_{(1+x)}$ precipitation at a pH comprised between 3.5 and 5.5, since that range has been found to allow carrying out an almost complete insolubilisation of Mn with low consumption of MgO and $Cl_2$, thereby producing an easily filterable precipitate of low magnesium content consisting primarily of $Mn_2O_3.MnOOH$.

It is a feature of the present invention that the metal values other than those of manganese and alkali and alkaline earth metals, e.g., Ni, Co, Cu, Mo, V, Fe, Al, and Zn, can, if desired, be separated in step (d) from the solution obtained as a result of step (c) as follows:

a'. contacting the solution with an extractant chosen from the group of extractants consisting of:

organophosphoric compounds having the general formula $(RO)_3P = O$ in which R represents a substituted or unsubstituted alkyl, aryl or aralkyl group; and phosphonic acid esters having the general formula $$R_1-P(OR_2)-(OR_3),$$

the phosphonous acid esters having the general formula $R_1 — P (OR_2)—(OR_3)$, phosphinic acid esters having the general formula $$\overset{O}{\underset{\|}{R_1-P(R_2)-(OR_3)}}$$

and phosphinous acid esters having the general formula $R_1—P(R_2)—(OR_3)$, where $R_1$, $R_2$ and $R_3$ represent the same or different substituted or unsubstituted hydrocarbon groups, the extractant being used in such an amount that the chlorides of Fe, Mo, V and Zn are simultaneously extracted, thus producing a metal-bearing extractant and a raffinate which are separated;

b'. treating the raffinate formed in step (a') with $H_2S$, while keeping the pH of the raffinate below 2.5, thus producing a precipitate of copper sulfide and a substantially decopperized raffinate which are separated;

c'. bringing the pH of the decopperized raffinate formed in step (b') between 2 and 6, preferably between 2.5 and 5, thus producing a precipitate of aluminum hydroxyde and a substantially dealuminized raffinate which are separated;

d'. treating the dealuminized raffinate formed in step (c') with $H_2S$, while keeping its ph between 3 and 6, preferably between 3 and 4.5, thus producing a precipitate consisting substantially of Co and Ni sulfides and a manganiferous raffinate which are separated.

Another suitable way for carrying out step (d), if the concentrated solution obtained in step (c) contains the above mentioned elements, comprises:

a''. extracting Mo and V from said solution by contacting the latter with an alpha-hydroxy-oxime extractant, thus producing a metal-bearing extractant and a rafinate which are separated;

b''. adjusting the pH of the raffinate formed in step (a'') to between 2 and 4, thus producing a precipitate of Fe and Al hydroxides and a deferrized and dealuminized solution which are separated;

c''. contacting the deferrized and dealuminized solution formed in step (b'') with an extractant chosen from the aforesaid group of extractants, the extractant being used in such an amount that zinc chloride is selectively extracted, thus producing a zinc chloride-bearing extractant and a zinc-free raffinate which are separated;

d''. treating said zinc-free raffinate formed in step (c'') with $H_2S$, while keeping the pH of the raffinate below 2.5, thus producing a precipitate of copper sulphide and a substantially decopperized raffinate which are separated; and e''. bringing the pH of said decopperized raffinate between 3 and 6, preferably between 3 and 4.5, and treating it with $H_2S$, thus producing a precipitate consisting substantially of Co and NI sulfides and a manganiferous raffinate which are separated.

Tributylphosphate can be advantageously used as organophosphoric compound, and the diisobutyl ester of isobutylphosphonic acid, sold under the registered name of "Hostarex PO 212" and made by "Hoechst" of West Germany, can be used as phosphonic acid ester in (a') or (c'').

If trivalent vanadium is present in the solution, obtained in step (c), such vanadium will preferably be brought to the pentavalent state before the solution is contacted with an extractant in (a') or (a'') in order to ensure an almost complete extraction of vanadium.

The copper sulfide precipitate obtained in (b') or (d") can be transformed into copper sulfate solution by oxidation in aqueous medium and the sulfate solution can be subjected to electrolysis.

The precipitate obtained in (d') or (e") can be advantageously processed for producing a nickel chloride solution and a cobalt chloride solution by a method which comprises:

a'''. treating the precipitate in hydrochloric acid under an oxygen pressure of between 1 and 10 kg/cm$^2$, at a temperature of between 50° and 114° C, thus producing a chloride solution containing a minor amount of sulfate ions and, suspended in it, elemental sulfur;

b'''. raising the temperature of the chloride solution formed in step (a''') above 114° C, thus smelting and globulizing sulfur, and separating the sulfur from the solution;

c'''. treating the solution resulting from step (b''') with a compound chosen from the group of compounds consisting of CaO, Ca(OH)$_2$, CaCl$_2$, BaO, Ba(OH)$_2$ and BaCl$_2$, thus producing a precipitate of CaSO$_4$ or BaSO$_4$ and a desulfatized solution which are separated;

d'''. contacting the desulfatized solution obtained in step (c''') with a tertiary amine hydrochloride extractant, thus producing a cobalt-bearing extractant and a nickel chloride-containing raffinate which are separated;

e'''. contacting the cobalt-bearing extractant formed in step (d''') with a reextractant chosen from the group of reextractants consisting of water and dilute hydrochloric acid (pH 1), thus producing an aqueous cobalt chloride solution and regenerating the extractant.

The free acidity of the concentrated solution which is contacted with an extractant in (a') is desirably lower than 10 g HCl/l, since it has been found that low acidity during extraction permits subsequent reextraction with small amounts of reextractant so that highly concentrated eluates can be obtained.

The metal-bearing extractant obtained in (a') is preferably processed to regenerate the extractant and separate its metal content by a method which comprises:

a''''. contacting said extractant with water, thus producing an aqueous solution of chlorides of Fe, Mo, V and Zn and a regenerated extractant which are separated;

b''''. extracting Mo and v from the aqueous solution obtained in step (a'''') by contacting the latter with an alpha-hydroxy-oxime extractant, thus producing a metal-bearing extractant and a raffinate which are separated;

c''''. contacting the metal-bearing extractant obtained in step (b'''') with a reextractant chosen from the group of reextractants consisting of an acid solution and an alkaline solution, thus producing an aqueous solution of Mo and V and a regenerated extractant, which are separated;

d''''. adding sulfuric acid to the raffinate obtained in (b'''') and then pyrohydrolizing the raffinate, thus producing a mixture of iron oxide and zinc sulfate and gaseous HCl, which can be recycled to step (b);

e''''. washing the mixture formed in step (d'''') with water, thus producing an zinc sulfate solution and an iron oxide residue which are separated.

Before precipitating aluminum in step (c') it may be desirable to add an amount of trivalent iron to the decopperized raffinate, which iron will act as coprecipitating agent.

The alpha-hydroxy-oxime to be used in (a") or (b'''') will preferably be chosen from the group of oximes consisting of 5,8-diethyl-7-hydroxydodecan-6-oxime, 19-hydroxyhexatriaconta-9,27-dien-18-oxime, and 5,10-diethyl-8-hydroxytetradecan-7-oxime. Such oxime is sold under the registered name of "LIX-63" and made by "General Mills Inc.", Tucson, Arizona.

The zinc chloride-bearing extractant obtained in step (c") can be contacted with water, thus producing an aqueous zinc chloride solution and regenerating the extractant. This aqueous zinc chloride solution can be subjected to electrolysis, pyrohydrolysis or other well-known techniques in order to produce either metal or saleable metal compounds and, possibly, chlorine or hydrochloric acid for recycling. This will be also the case with the aqueous NiCl$_2$ solution obtained in (d''''), the aqueous CoCl$_2$ solution obtained in (e''') and the aqueous ZnSO$_4$ solution obtained in (e'''').

All above-mentioned organic extractants can be used either in non-diluted state or dissolved in inert organic solvents, such as kerosene, with or without addition of phase separating activators such as long chain aliphatic alcools, e.g., isodecanol.

The above-described processes for separating metal values from concentrated chloride solutions containing Mn, Ni, Co, Cu, Mo, V, Fe, Al and Zn, do not depend on the manner in which said solutions were obtained. Also, the processes can be easily adapted for treating concentrated chloride solutions containing Mn, Ni, Co, Cu and Fe, but not containing Mo and/or V and/or Al and/or Zn.

DESCRIPTION OF THE DRAWING

The accompanying DRAWING is a flowsheet of a preferred mode of carrying out the process according to the present invention.

Referring to the drawing, the nodule ore is wet ground to a particle diameter size of not greater than about 2 mm. The slurried ore is fed batch-wise to six leach reactors. In the first reactor, leaching is carried out with a mixture of make-up hydrochloric acid and hydrochloric acid obtained by scrubbing the pyrohydrolysis exit gases with water. The leach pulp obtained in the first reactor is acidified in a scrubber for the pyrohydrolysis exit gases and then used as leaching medium in the second reactor. The leach pulp from the second reactor is acidified in the same way as the leach pulp from the first reactor and is then used as leaching medium in the third reactor and so on until a highly concentrated leach liquor, containing between about 110 and 120 g Mn/l is obtained in the sixth reactor. The initial acidity in leaching reactors 2 to 6 is between 170 and 210 g HCl/l, which is easily obtained by scrubbing the chloride pyrohydrolysis exit gases. The initial acidity in the first leach reactor may be the same as in the other ones or it may be higher, for example 250–350 g HCl/l; this depends on the concentration of the make-up (fresh) hydrochloric acid. The amount of nodule ore fed to each reactor is such that the initial HCl content of that reactor is 5 to 20% higher than the stoichiometric amount required for transforming into chlorides the metallic compounds contained in the ore. Although the leaching rate decreases in the last reactors, a retention time of only about 30 minutes in each reactor has been found to produce a high yield of dissolution, e.g., 99.9% Mn, 99.9% Ni, 99.5% Co and 99.9% Cu.

The leach pulp from the sixth reactor is filtered and the resulting liquor, if containing Mn, Ni, Co, Cu, Fe, Zn, Mo, V, Al, Mg, Ca and alkaline metals, is then depleted as follows: extraction of Fe, Zn, Mo and V with tributylphosphate (TBP), precipitation of copper with $H_2S$, precipitation of Al with recycled MgO, precipitation of Ni and Co with $H_2S$ and recycled MgO, precipitation of Mn with recycled $Cl_2$ and recycled MgO.

The demanganized solution is pyrohydrolyzed in a sprayroaster, thus producing HCl gas for recycling and MgO, which after washing, is parly recycled for neutralizing and partly transformed into periclase.

The TBP phase is stripped with water, thus producing an aqueous Fe-Zn-Mo-V chloride solution and regenerated TBP. From said aqueous solution, Mo and V are extracted with LIX-63, leaving a Fe-Zn chloride-bearing raffinate which after addition of $H_2SO_4$ is pyrohydrolyzed in a spray-roaster thus producing HCl for recycling and a $Fe_2O_3$-$ZnSO_4$ mixture. The LIX-63 phase is stripped with a diluted NaOH solution, thus producing an aqueous sodium vanadate and molybdate solution and regenerated LIX-63.

CuS, NiS-CoS and $Fe_2O_3$-$ZnSO_4$ can be further processed as described above. The manganiferous precipitate can be dried, calcinated and transformed by reduction or molten salt electrolysis into manganese metal. MO and V can be simultaneously or selectively recovered from said vanadate and molybdate solution by any known process.

DESCRIPTION OF PREFERRED EMBODIMENTS

The following examples are presented for the purpose of illustrating, without limitation, the process of the present invention and the advantages thereof. In the examples, parts and percentages are by weight unless otherwise indicated.

EXAMPLE 1

This example describes the leaching of a Pacific Ocean nodule ore having the following analysis: 27.65 Mn, 1.10 Cu, 1.22 Ni, 0.20 Co, 0.14 Zn, 0.072 V, 0.067 Mo, 1.84 Mg, 0.30 Ba, 2.70 Na, 1.15 K, 3.02 Al, 2.14 Ca, 18 $SiO_2$, 6.33 Fe and minor amounts of Pb, Zr, Bi and Sr.

The ore is wet-ground to minus 2 mm and leaching is carried out on the ground pulp in a six-reactor set-up for 30 minutes and at a temperature of about 70° C, i.e., the temperature which would normally be reached in an industrial reactor as a result of the exothermic character of the leaching reactions.

Reactor inputs and output are as tabulated in Table I, below, exclusive of chlorine output:

Table I

| Reactor | Input Nodule Ore (dry weight) | Leach Reagent* | Output (pulp) |
|---|---|---|---|
| 1 | 1.000 g | 4.05 l | 6.934 g |
| 2 | 0.988 | output 1** | 10.046 |
| 3 | 1.284 | output 2** | 14.086 |
| 4 | 1.669 | output 3** | 19.348 |
| 5 | 2.169 | output 4** | 26.182 |
| 6 | 2.561 | output 5** | 34.252 |

* Hydrochloric acid containing 272 g HCl/l
** Acidified with HCl gas up to an acid content of 200 g HCl/l Filtration of output pulp from reactor 6 gives 23.8 liters of a solution containing in g/l: 112.4 Mn, 4.4 Cu, 4.9 Ni, 0.8 Co, 0.28 V, 0.24 Mo, 7 Mg, 25.1 Fe. Dissolution yields (%) obtained were as follows: 99.9 Cu, 99.9 Ni, 99.5 Co 97 Fe, and 99.9 Mn.

EXAMPLE 2

This example relates to the extraction with TBP of Fe, Zn, Mo and V from an aqueous chloride solution containing, in g/l: 112.4 Mn, 4.45 Cu, 4.93 Ni, 0.8 Co, 0.56 Zn, 0.28 V, 0.24 Mo and 25.1 Fe.

The extraction is carried out with non-diluted TBP, countercurrently in 3 stages with an organic phase: aqueous phase ratio (O:A) equal to 1/2. The raffinate contains in g/l: 111.9 Mn, 4.42 Cu, 4.91 Ni, 0.79 Co, 0.00 Zn, 0.00 V, 0.00 Mo and 0.00 Fe.

The extraction yields (%) are greater than 99.9 for Fe, Zn, Mo and V.

The loaded TBP is stripped with water, countercurrently in 6 stages with an O:A ratio equal to 2.5/1. The eluate contains, in g/l: 125 Fe, 2.8 Zn, 1.2 Mo and 1.4 V (as chlorides).

EXAMPLE 3

This example describes the removal of Cu as CuS from a solution containing, in g/l: 130.0 Mn, 5.32 Cu, 1.10 Co and 5.65 Ni.

$H_2S$ gas is injected at 20° C counter-currently to the solution in a column; the feed rate is so regulated that the $H_2S$ is completely consumed at the top of the column.

Input :
  10.0 l. solution
  0.029 kg $H_2S$ gas
Output :
  10.0 l. solution containing in g/l: 130.0 Mn, 0.001 Cu, 1.10 Co and 5.65 Ni
  0.024 kg dry residue containing in %: 3.47 Mn, 62.5 Cu, 0.026 Co and 0.101 Ni The precipitation yield has been in %: 99.9 Cu, 0.01 Mn, 0.2 Co and 0.2 Ni.

EXAMPLE 4

This example describes the removal of Ni and Co as sulfides from a solution containing, in g/l: 130.0 Mn, 5.65 Ni and 1.10 Co.

$H_2S$ gas is injected at 20° C counter-currently to the solution in a column; the feed rate is so regulated that the $H_2S$ is completely consumed at the top of the column; the solution is continuously neutralised with MgO at a pH = 4.

Input:
  9.9 l. solution
  0.05 kg $H_2S$ gas
  0.16 kg MgO (in pulp)
Output:
  10.16 l. solution containing in g/l: 116.2 Mn, 0.01 Ni and 0.004 Co
  0.150 kg dry residue (oxidized on drying) containing in %: 0.29 Mn, 37.1 Ni and 7.2 Co. Precipitation yield in %: 0.03 Mn, 99.7 Ni and 99.3 Co.

EXAMPLE 5

This example illustrates the precipitation of Mn from a solution containing in g/l: 132.7 Mn and 42.5 Mg.

Chlorine is injected into a reactor equipped with stirrer and baffle; MgO is continuously fed in order to keep the pH between 3.5 and 4.

Input:
  2 l. solution
  0.175 kg $Cl_2$ 0.295 kg MgO
Output:
2.25 l. solution containing in g/l: 0.03 Mn and 117 Mg
0.5 kg dry residue (only water washed) containing in %: 53.0 Mn and 0.63 Mg
Precipitation yield in %: 99.98 Mn. Duration of test: 1 hour.

The foregoing examples are presented for the purpose of illustrating the process of the present invention. It is understood that changes and variations can be made therein without departing from the scope of the invention as defined in the following claims.

I claim:

1. A process for extracting metal values from manganiferous ocean floor nodule ore containing at least one metal selected from the group consisting of Ni, Co, Cu, Mo, V, Fe, Al and Zn, said process comprising:
    a. treating an amount of ore with hydrochloric acid containing at least 150 g HCl/liter, the amount of acid used corresponding to between 0.95 and 1.3 times the stoichiometric amount of HCl needed to transform into chlorides the metal values contained in the ore, thereby producing chlorine and starting pulp containing a solution of metal chlorides and a solid residue;
    b. subjecting the starting pulp to at least 2 subsequent acidifications with HCl, each acidification being carried out by adding HCl to the pulp in an amount needed to obtain an initial HCl content in the pump of at least 150 g/l and followed by addition of fresh ore in amounts such as to obtain the HCl:ore ratio defined in step (a), thereby producing chlorine and a final pulp containing a concentrated solution of metal chlorides and a solid residue;
    c. separating the solid residue from the concentrated solution in the final pump formed in step (b);
    d. separating substantially all metal values except manganese and the alkali and alkaline earth metals from the concentrated solution resulting from step (c);
    e. separating the manganese from the solution resulting from step (d) by treating said solution with chlorine, at least the major part of said chlorine being produced in steps (a) and (b), while maintaining the pH of the solution between 3 and 7 by addition of a neutralizing agent selected from the group consisting of MgO and Mg(OH)$_2$, at least the major part of said manganese being precipitated as MnO$_{(1+x)}$ according to the following equation when the neutralizing agent is MgO: MnCl$_2$ + (1+x)MgO + xCl$_2$ → MnO$_{(1+x)}$ ↓ + (1+x)MgCl$_2$ or according to the following equation when the neutralizing agent is Mg(OH)$_2$: MnCl$_2$ + (1+x)Mg(OH)$_2$ + xCl$_2$ → MnO$_{(1+x)}$ ↓ + (1+x)MgCl$_2$ + (1+x)H$_2$O wherein X is between 0.5 and 0.7, thereby forming a solution of magnesium chloride;
    f. separating the manganiferous precipitate from the magnesium chloride solution;
    g. pyrohydrolyzing the magnesium chloride solution obtained in step (f) in the atomized state thereby generating the neutralizing agent and HCl; and
    h. recycling the regenerated neutralizing agent to step (e) and the regenerated HCl to step (b).

2. A process according to claim 1 wherein the starting pulp is subjected to between 4 and 6 subsequent acidifications in step (b) and the MnO$_{(1+x)}$ is precipitated from the solution in step (e) at a pH of between about 3.5 and 5.5.

3. A process according to claim 1, wherein step (d) comprises:
    a'. contacting the concentrated solution resulting from step (c) with an extractant chosen from the group of extractants consisting of:
        1. organophosphoric compounds having the general formula (RO)$_3$P = O wherein R represents an unsubstituted or substituted alkyl, aryl or aralkyl group; and
        2. phosphonic acid esters having the general formula

phosphonous acid esters having the general formula R$_1$ — P (OR$_2$) — OR$_3$, phosphinic acid esters having the general formula

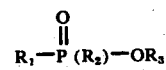

and phosphinous acid esters having the general formula R$_1$ — P (R$_2$) — OR$_3$, wherein R$_1$, R$_2$ and R$_3$ represent the same or different, unsubstituted or substituted hydrocarbon groups, said extractant being used in such an amount that the chlorides of Fe, Mo, V and Zn are simultaneously extracted, thereby producing a metal-bearing extractant and a raffinate, and separating the extractant from the raffinate;
    b'. treating the raffinate formed in step (a') with H$_2$S, while keeping the pH of the raffinate below 2.5, thereby producing a precipitate of copper sulfide and a substantially decopperized raffinate, and separating the precipitate from the raffinate;
    c'. adjusting the pH of the decopperized raffinate formed in step (b') to between 2 and 6, thereby producing a precipitate of aluminum hydroxide and a dealuminized raffinate, and separating the precipitate from the raffinate; and
    d'. treating the dealuminized raffinate formed in step (c') with H$_2$S, while keeping the pH between 3 and 6, thereby producing a precipitate consisting substantially of Co and Ni sulfides and a manganiferous raffinate, and separating the precipitate from the raffinate.

4. A process according to claim 3 wherein:
    the organophosphoric compound and the phosphonic acid ester used in step (a') are tributyl phosphate and the diisobutyl ester of isobutylphosphonic acid, respectively;
    the pH in step (d') is kept between 3 and 4.5;
    the vanadium in the solution resulting from step (c) is brought to the pentavalent state before said solution is contacted with an extractant in step (a'); and
    the precipitate of copper sulfide obtained in step (b') is transformed into copper sulfate solution by oxidation in aqueous medium and the resulting copper sulfate solution is subjected to electrolysis.

5. A process according to claim 3, wherein the precipitate obtained in (d') is processed for obtaining a nickel chloride solution and a cobalt chloride solution, which processing comprises:

a'''. contacting the precipitate with hydrochloric acid under an oxygen pressure of between 1 and 10 kg/cm$^2$, at a temperature of between 50 and 114° C, thereby producing a chloride solution containing a minor amount of dissolved sulphate ions and suspended elemental sulfur;

b'''. raising the temperature of said chloride solution above 114° C, thereby smelting and globulizing the sulfur, and separating the sulfur from the solution, c'''. treating the solution resulting from (b''') with a compound selected from the group of compounds consisting of CaO, Ca(OH)$_2$, CaCl$_2$, BaO, Ba(OH)$_2$ and BaCl$_2$, thereby producing a precipitate of CaSO$_4$ or BaSO$_4$ and a desulfatized solution, and separating the precipitate from the desulfatized solution;

d'''. contacting the desulfatized solution with a hydrochlorinated tertiary amine extractant, thereby producing a cobalt-bearing extractant and a nickel chloride containing raffinate, and separating the cobalt-bearing extractant from the nickel chloride-containing raffinate;

e'''. contacting the cobalt-bearing extractant with a reextractant selected from the group of reextractants consisting of water and weak hydrochloric acid having a pH $\geq$ 1, thereby producing an aqueous cobalt chloride solution and regenerating the extractant.

6. A process according to claim 3 wherein:
the acidity of the solution resulting from step (c) is reduced to below 10 g HCl/l prior to step (a');
an amount of trivalent iron is added to the decopperized raffinate formed in step (b') prior to precipitating the aluminum in step (c'); and
the pH of the decopperized raffinate is adjusted in step (c') to between 2.5 and 5.

7. A process according to claim 3, characterized in that the metal bearing extractant obtained in (a') is processed for regenerating the extractant and separating its metal content, which processing comprises:

a''''. contacting said extractant with water, thus producing an aqueous solution of chlorides of Fe, Mo, V and Zn and a regenerated extractant which are separated, b''''. extracting Mo and V from the aqueous solution obtained in (a'''') by contacting the latter with an alpha-hydroxy-oxime extractant selected from the group consisting of 5, 8-diethyl-7-hydroxydodecan-6-oxime, 19-hydroxyhexatriaconta-9, 27-dien-18-oxime, and 5, 10-diethyl-8-hydroxytetradecan-7-oxime, thereby producing a metal-bearing extractant and a raffinate, and separating the metal-bearing extractant and the raffinate;

c''''. contacting the metal-bearing extractant obtained in (b'''') with a reextractant chosen from the group of reextractants consisting of an acid solution and an alkaline solution, thereby producing an aqueous solution of Mo and V and a regenerated extractant, and separating the solution of Mo and V from the regenerated extractant;

d''''. adding sulfuric acid to the raffinate obtained in (b'''') and then pyrohydrolizing said raffinate, thereby producing a mixture of iron oxide and zinc sulphate and gaseous HCl; and e''''. washing the mixture formed in (d'''') with water, thereby producing a zinc sulfate solution and an iron oxide residue, and separating the zinc sulfate solution from the iron oxide residue.

8. A process according to claim 1, wherein step (d) comprises a''. extracting Mo and V from the solution resulting from step (c) by contacting said solution with an alpha-hydroxy-oxime extractant, thereby producing a metal-bearing extractant and a raffinate, and separating the metal-bearing extractant from the raffinate;

b''. adjusting the pH of the raffinate found in step (a'') to between 2 and 4, thereby producing a precipitate of Fe and Al hydroxides and a deferrized and dealuminized solution, and separating the hydroxides from the deferrized and dealuminized solution;

c''. contacting the de-ferrized and de-aluminized solution formed in step (b'') with an extractant chosen from the group of extractants consisting of:

1. organophosphoric compounds having the general formula (RO)$_3$ P = O wherein R represents an unsubstituted or substituted alkyl, aryl or aralkyl group; and 2. phosphonic acid esters having the general formula

the phosphonous acid exters having the general formula R$_1$ — P (OR$_2$) — OR$_3$, the phosphinic acid esters with the general formula

and the phosphinous acid esters having the general formula R$_1$ — P (R$_2$) — OR$_3$, wherein R$_1$, R$_2$, and R$_3$ represent the same or different, unsubstituted or substituted hydrocarbon groups; said extractant being used in such an amount that zinc chloride is selectively extracted, thereby producing a zinc chloride-bearing extractant and a zinc-free raffinate, and separating the zinc chloride-bearing extractant from the zinc-free raffinate;

d''. treating said zinc-free raffinate formed in step (c') with H$_2$S, while keeping the pH of the raffinate below 2.5, thereby producing a precipitate of copper sulfide and a substantially decopperized raffinate and separating the copper sulfide precipitate and the decopperized raffinate; and e''. adjusting the pH of the decopperized raffinate formed in step (d'') to between 3 and 6 and treating said raffinate with H$_2$S, thereby producing a precipitate consisting substantially of Co and Ni sulfides and a manganiferous raffinate, and separating the precipitate from the manganiferous raffinate.

9. A process according to claim 8 wherein:
the organophosphoric compound and the phosphonic acid ester used in step (c'') are tributyl phosphate and the diisobutyl ester of isobutyl phosphonic acid, respectively;
the pH in step (e'') is kept between 3 and 4.5;
the vanadium in the solution resulting from step (c) is brought to the pentavalent state before said solution is contacted with an extractant in step (a''); and the precipitate of copper sulfide obtained in step (d") is transformed into copper sulfate solution by oxidation in aqueous medium and the resulting copper sulfate solution is subjected to electrolysis.

10. A process according to claim 8 wherein the precipitate obtained in (e") is processed for obtaining a nickel chloride solution and a cobalt chloride solution, which processing comprises:
   a'''. contacting the precipitate with hydrochloric acid under an oxygen pressure of between 1 and 10 kg/cm$^2$, at a temperature of between 50 and 114° C, thereby producing a chloride solution containing a minor amount of dissolved sulfate ions and suspended elemental sulfur;
   b'''. raising the temperature of said chloride solution above 114° C, thereby smelting and globulizing the sulfur, and separating the sulfur from the solution,
   c'''. treating the solution resulting from (b''') with a compound selected from the group of compounds consisting of CaO, Ca(OH)$_2$, CaCl$_2$, BaO, Ba(OH)$_2$ and BaCl$_{2l}$, thereby producing a precipitate of CaSO$_4$ or BaSO$_4$ and a desulfatized solution, and separating the precipitate from the desulfatized solution;
   d'''. contacting the desulfatized solution with a hydrochlorinated tertiary amine extractant, thereby producing a cobalt-bearing extractant and a nickel chloride-containing raffinate, and separating the cobalt-bearing extractant from the nickel chloride-containing raffinate;
   e'''. contacting the cobalt-bearing extractant with a reextractant selected from the group of reextractants consisting of water and weak hydrochloric acid having a pH $\geq$ 1, thereby producing an aqueous cobalt chloride solution and regenerating the extractant.

11. A process according to claim 8 wherein:
   the alpha-hydroxy-oxime used in (a") is selected from the group consisting of 5,8-diethyl-7-hydroxydodecan-6-oxime, 19-hydroxyhexatriaconta-9,27-dien-18-oxime, and 5, 10-diethyl-8-hydroxyteteradecan-7-oxime, and;
   the zinc chloride-bearing extractant obtained in (c") is contacted with water, thus producing an aqueous zinc chloride solution and regenerating the extractant.

12. A process for extracting metal values from a solution of the chlorides of Mn, Fe, Co, Cu, Ni, Mo, V, Al and Zn, said process comprising:
   A. contacting the solution with an extractant selected from the group consisting of:
      1. the organophosphoric compounds having the general formula (RO)$_3$ P = O wherein R represents an unsubstituted or substituted alkyl, aryl or aralkyl group; and
      2. phosphonic acid esters having the general formula

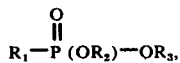

phosphonous acid esters having the general formula R$_1$ — P (OR$_2$) — OR$_3$, phosphinic acid esters having the general formula

and phosphinous acid esters having the general formula R$_1$ — P (R$_2$) — OR$_3$, where R$_1$, R$_2$ and R$_3$ represent the same or different, unsubstituted or substituted hydrocarbon groups, the extractant being used in an amount such that the chlorides of Fe, Mo, V and Zn are simultaneously extracted, thereby producing a metal-bearing extractant and a raffinate, and separating the metal-bearing extractant from the raffinate;

B. treating the raffinate obtained in step (A) with H$_2$S, while keeping the pH of the raffinate below 2.5, thereby producing a precipitate of copper sulfide and a substantially decopperized raffinate and separating the decopperized raffinate from the copper sulfide;
   C. adjusting the pH of the decopperized raffinate formed in (B) to between 2 and 6, thereby producing a precipitate of aluminum hydroxide and a dealuminized raffinate, and separating the aluminum hydroxide precipitate from the dealuminized raffinate;
   D. treating the dealuminized raffinate formed in step (C) with H$_2$S, while keeping the pH of the raffinate between 3 and 6, thereby producing a precipitate consisting substantially of Co and Ni sulfides and a manganiferous raffinate, and separating the precipitate from the manganiferous raffinate; and
   E. demanganizing the manganiferous raffinate obtained in (D).

13. A process according to claim 12 wherein the demanganizing step (E) is carried out by treating the manganiferous raffinate formed in step (D) with chlorine while maintaining the pH of the solution between about 3 and 7 by addition of a neutralizing agent selected from the group consisting of MgO and MG(OH)$_2$, whereby at least the major part of the manganese is precipitated as MnO$_{(1+x)}$ wherein x is between 0.5 and 0.7.

14. A process for extracting metal values from a solution of the chlorides of Mn, Fe, Co, Cu, Ni, Mo, V, Al and Zn, said process comprising:
   A'. extracting Mo and V from the solution by contacting the latter with an alpha-hydroxy-oxime extractant, thereby producing a metal-bearing extractant and a raffinate, and separating the extractant from the raffinate;
   B'. adjusting the pH of the raffinate formed in (A') to between 2 and 4, thereby producing a precipitate of Fe and Al hydroxides and a deferrized and dealuminized solution, and separating the precipitate from the deferrized and dealuminized solution;
   C'. contacting deferrized and dealuminized solution obtained in (B') with an extractant selected from the group consisting of:
      1. organophosphoric compounds having the general formula (RO)$_3$ P = O wherein R represents an unsubstituted or substituted alkyl, aryl or aralkyl group;
      2. phosphonic acid esters having the general formula

phosphonous acid esters havin the general formula $R_1 - P(OR_2) - OR_3$, phosphinic acid esters having the general formula

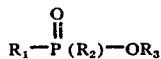

and phosphinous acid esters having the general formula $R_1 - P(R_2) - OR_3$, where $R_1$, $R_2$ and $R_3$ represent the same or different, unsubstituted or substituted hydrocarbon groups, the extractant being used in an amount such that zinc chloride is selectively extracted, thereby producing a zinc chloride-bearing extractant and zinc-free raffinate, and separating the extractant from the raffinate;

D'. treating said zinc-free raffinate formed in step (C') with $H_2S$, while keeping the pH of the raffinate below 2.5, thereby producing a precipitate of copper sulfide and a substantially decopperized raffinate, and separating the copper sulfide precipitate from the decopperized raffinate;

E'. adjusting the pH of the decopperized raffinate obtained in (D') to between 3 and 6 and treating said raffinate with $H_2S$, thereby producing a precipitate consisting substantially of Co and Ni sulfides and a manganiferous raffinate, and separating the precipitate from the manganiferous raffinate; and F'. demanganizing the manganiferous raffinate obtained in step (E').

15. A process according to claim 14 wherein the demanganizing step (F') is carried out by treating the manganiferous raffinate formed in step (E) with chlorine while maintaining the pH of the solution between about 3 and 7 by addition of a neutralizing agent selected from the group consisting of MgO and $MG(OH)_2$, whereby at least the major part of the manganese is precipitated as $MnO_{(1a+x)}$ wherein $x$ is between 0.5 and 0.7.

16. A process for extracting metal values from manganiferous ocean floor nodule ore containing at least one metal selected from the group consisting of Ni, Co, Cu, Mo, V, Fe, Al and Zn, said process comprising:

a. treating an amount of ore with hydrochloric acid containing at least 150 g HCl/liter, the amount of acid used corresponding to between 0.95 and 1.3 times the stoichiometric amount of HCl needed to transform into chlorides the metal values contained in the ore, thereby producing chlorine and a starting pulp containing a solution of metal chlorides and a solid residue;

b. subjecting the starting pulp to at least 2 subsequent acidifications with HCl, each acidification being carried out by adding HCl to the pulp in an amount needed to obtain an intial HCl content in the pulp of at least 150 g/l and followed by addition of fresh ore in amounts such as to obtain the HCl:ore ratio defined in step (a), thereby producing chlorine and a final pulp containing a concentrated solution of metal chlorides and a solid residue;

c. separating the solid residue from the concentrated solution in the final pulp formed in step (b);

d. separating substantially all metal values except manganese and the alkali and alkaline earth metals from the concentrated solution resulting from step (c);

e. separating the manganese from the solution resulting from step (d) by treating said solution with chlorine while maintaining the pH of the solution between 3 and 7 by addition of a neutralizing agent selected from the group consisting of MgO and $Mg(OH)_2$, at least the major part of said manganese being precipitated as $MnO_{(1+x)}$ according to the following equation when the neutralizing agent is MgO: $MnCl_2 + (1+x)MgO + xCl_2 \rightarrow MnO_{(1+x)}\downarrow + (1+x)MgCl_2$ or according to the following equation when the neutralizing agent is $Mg(OH)_2$: $MnCl_2 + (1+x(Mg(OH)_2 + xCl_2 \rightarrow MnO_{(1+x)} \downarrow + (1+x)MgCl_2 + (1+x)H_2O$ wherein $x$ is between 0.5 and 0.7, thereby forming a solution of magnesium chloride; and f. separating the manganiferous precipitate from the magnesium chloride solution.

17. A process according to claim 16 wherein at least the major part of the chlorine used in step (e) is produced in steps (a) and (b).

18. A process for extracting metal values from manganiferous ocean floor nodule ore containing at least one metal selected from the group consisting of Ni, Co, Cu, Mo, V, Fe, Al and Zn, said process comprising:

a. treating an amount of ore with hydrochloric acid thereby producing chlorine and a pulp containing a solution of metal chlorides and a solid residue;

b. separating the solid residue from the solution in the pulp formed in step (a);

c. separating substantially all metal values except manganese and the alkali and alkaline earth metals from the solution resulting from step (b);

d. separating the manganese from the solution resulting from step (c) by treating said solution with chlorine, while maintaining the pH of the solution between 3 and 7 by addition of a neutralizing agent selected from the group consisting of MgO and $Mg(OH)_2$, at least the major part of said manganese being precipitated as $MnO_{(1+x)}$ according to the following equation when the neutralizing agent is $MgO: MnCl_2 + (1+x)MgO + xCl_2 \rightarrow MnO_{(1+x)} \downarrow + (1+x)MgCl_2$ or according to the following equation when the neutralizing agent is $Mg(OH)_2$: $MnCl_2 + (1+x)Mg(OH)_2 + xCl_2 \rightarrow MnO_{(1+x)} \downarrow + (1+x)MgCl_2 + (1+x)H_2O$ wherein $x$ is between 0.5 and 0.7, thereby forming a solution of magnesium chloride; and e. separating the manganiferous precipitate from the magnesium chloride solution.

19. A process according to claim 18 wherein the hydrochloric acid used in step (a) contains at least 150 g HCl/l, the amount of said acid used corresponding to between 0.95 and 1.3 times the stoichiometric amount of HCl needed to transform into chlorides the metal values contained in the ore.

* * * * *

UNITED STATES PATENT AND TRADEMARK OFFICE
CERTIFICATE OF CORRECTION

PATENT NO. : 4,026,773

DATED : May 31, 1977

INVENTOR(S) : Antoine L. Van Peteghem

It is certified that error appears in the above-identified patent and that said Letters Patent are hereby corrected as shown below:

Column 2, line 66, "$MnO_{(1\ x)}^{+}$" should read -- $MnO_{(1+x)}$ -- .

" 4, " 26, "ph" should read -- pH -- .

" 4, " 56, "NI" should read -- Ni -- .

" 5, " 30, "(ph  1)" should read -- (ph $\geq$ 1) -- .

" 5, " 46, "v" should read -- V -- .

" 5, " 63, "producing an" should read -- producing a --

" 6, lines 1-2, "(b'$\lambda$''')" should read -- (b'''') -- .

" 6, " 16-17, "(d'$\lambda$''')" should read -- (d''') -- .

" 7, " 11, "sprayroaster" should read -- spray-roaster

" 9, " 30, "pump" should read -- pulp -- .

" 9, " 37, "pump" should read -- pulp -- .

UNITED STATES PATENT OFFICE
CERTIFICATE OF CORRECTION

Patent No. 4,026,773              Dated  May 31, 1977

Inventor(s) Antoine L. Van Peteghem

It is certified that error appears in the above-identified patent and that said Letters Patent are hereby corrected as shown below:

Col. 12, line 29, "exters" should read --esters--.

Col. 13, line 21, "$BaCl_2$" should read --$BaCl_2$--.

Col. 15, line 1, "havin" should read --having--.

Col. 15, line 39, "$MnO_{(1a+x)}$" should read --$MnO_{(1+x}$--.

Col. 16, line 18, "(1+x(" should read --(1+x)--.

Signed and Sealed this

Twentieth Day of September 1977

[SEAL]

Attest:

RUTH C. MASON
Attesting Officer

LUTRELLE F. PARKER
Acting Commissioner of Patents and Trademarks